(12) United States Patent
Dillard

(10) Patent No.: US 10,402,851 B1
(45) Date of Patent: Sep. 3, 2019

(54) SELECTING A MESSAGE FOR PRESENTATION TO USERS BASED ON A STATISTICALLY VALID HYPOTHESIS TEST

(71) Applicant: INTUIT INC., Mountain View, CA (US)

(72) Inventor: Colin R. Dillard, Foster City, CA (US)

(73) Assignee: INTUIT, INC., Mountain View, CA (US)

( * ) Notice: Subject to any disclaimer, the term of this patent is extended or adjusted under 35 U.S.C. 154(b) by 1063 days.

(21) Appl. No.: 14/497,183

(22) Filed: Sep. 25, 2014

(51) Int. Cl.
G06Q 30/02 (2012.01)
G06F 3/0484 (2013.01)
G06F 17/18 (2006.01)

(52) U.S. Cl.
CPC ..... *G06Q 30/0243* (2013.01); *G06F 3/04842* (2013.01); *G06F 17/18* (2013.01); *G06Q 30/02* (2013.01); *G06Q 30/0201* (2013.01); *G06Q 30/0202* (2013.01); *G06Q 30/0254* (2013.01); *G06Q 30/0278* (2013.01)

(58) Field of Classification Search
CPC .................................................. G06Q 30/0243
See application file for complete search history.

(56) References Cited

U.S. PATENT DOCUMENTS

2007/0027865 A1* 2/2007 Bartz ................... G06F 17/2785
2015/0227962 A1* 8/2015 Wical ................. G06Q 30/0243
  705/14.42

* cited by examiner

Primary Examiner — John E Breene
Assistant Examiner — Jeffrey C Morgan
(74) Attorney, Agent, or Firm — Patterson + Sheridan, LLP

(57) ABSTRACT

The disclosed embodiments provide a system that facilitates selecting a message to be presented to users based on a statistically valid hypothesis test. During operation, the system runs a hypothesis test by presenting alternate versions of a message to a test set of users and receives user-feedback data. Next, the system obtains a significance level for the test and determines a number of independent data subsets associated with data from the test. The system subsequently uses the significance level and the number of independent data subsets to calculate an individual significance level for each independent data subset. The system then uses the individual significance levels to calculate an amount of user-feedback data required to achieve the significance level during the test, and selects one of the alternate versions of the message by analyzing the calculated amount of user-feedback data during the test. Finally, the system presents the selected version.

20 Claims, 4 Drawing Sheets

SELECTING A MESSAGE FOR PRESENTATION TO USERS BASED ON A STATISTICALLY VALID HYPOTHESIS TEST

BACKGROUND

Related Art

The disclosed embodiments relate to applications for hypothesis testing. More specifically, the disclosed embodiments relate to a technique for selecting a message for presentation to users based on a statistically valid hypothesis test.

Hypothesis testing may be conducted to perform statistical inference of data to reject or "fail to reject" a null hypothesis at a pre-specified significance level. For example, hypothesis testing may include an A/B test that shows two versions A and B of a web page, email, offer, article, and/or other information to users to determine if one version has a higher conversion rate than the other with a significance level of 5%. In this example, the null hypothesis is that versions A and B have the same conversion rate. If test results from the A/B test show that version B performed better than version A by a certain amount, the test results may be considered statistically significant, and version B may be used in subsequent communications with other users. Specifically, if there is less than 5% probability of the observed result or a more extreme result occurring by chance under the null hypothesis, the null hypothesis is rejected.

On the other hand, analysis and/or monitoring of data from a hypothesis test before the hypothesis test is finished may increase the likelihood that incorrect conclusions are drawn from the data. In particular, statistical fluctuations in the data during the hypothesis test may produce results that seem to be statistically significant but actually differ from results seen at the end of the hypothesis test. Thus, stopping the hypothesis test once statistically significant data is found may increase the rate of false positives in the hypothesis test, and may in turn, produce statistically invalid results.

Consequently, hypothesis testing may be improved by mechanisms for maintaining statistical validity during analysis and/or monitoring of hypothesis tests.

SUMMARY

Hypothesis testing, such as A/B testing, is often used to select among two or more versions of a message to optimize an outcome of interest. For example, an A/B test may include two different versions of an email offer, which are shown to two groups of users to determine which email offer has a better response rate. The email offer with the better response rate may then be shown to a subsequent group of users to increase sales made to the users.

During hypothesis testing, statistical inference may be applied to data to reject or "fail to reject" a null hypothesis at a pre-specified significance level. In other words, a hypothesis test may be run to determine if data collected during the hypothesis test produces a result that is statistically significant in supporting or rejecting the null hypothesis. However, ongoing analysis of the data while the hypothesis test is being run may violate the statistical validity of the hypothesis test, since such analysis may increase the false positive rate of the hypothesis test if the hypothesis test is stopped once statistically significant results are observed.

To facilitate accurate hypothesis testing, a number of independent data subsets associated with data from the hypothesis test may be determined. Each independent data subset may represent a subset of data collected in the hypothesis test for which the statistic under consideration has changed substantially from a previous subset of data from the hypothesis test. As a result, the independent data subsets may account for statistical fluctuations and/or changes to the result of the hypothesis test.

Next, an individual significance level may be calculated for each independent data subset from the number of independent data subsets and the statistical significance of the hypothesis test. For example, the same individual significance level may be obtained for each independent data subset by dividing the overall statistical significance of the hypothesis test by the number of independent data subsets. Alternatively, different individual significance levels may be produced by allocating a portion of the significance level to each independent data subset based on the position of the independent data subset in the data.

The individual significance level may then be used to facilitate the analysis of the hypothesis test. For example, the individual significance level may be included in a calculation of a metric associated with analysis of the hypothesis test. Because the individual significance level represents the contribution of the independent data subset to the overall statistical significance, the metric may more accurately reflect the statistical certainty of the hypothesis test at a given point than a conventional calculation of the metric that uses the overall significance level of the test at all points in the hypothesis test.

The disclosed embodiments provide a system that facilitates selecting a message to be presented to users based on a statistically valid hypothesis test. During operation, the system runs a hypothesis test by presenting alternate versions of a message to a test set of users and in response receives user feedback. Next, the system obtains a significance level for the hypothesis test and determines a number of independent data subsets associated with data from the hypothesis test. The system subsequently uses the significance level and the number of independent data subsets to calculate an individual significance level for each independent data subset. The system then uses the individual significance levels to determine an outcome of the hypothesis test, which involves selecting a version of the message based on the user feedback. Finally, the system presents the selected version of the message to additional users.

In some embodiments, the number of independent data subsets is determined using a logarithm of a total number of observations in the hypothesis test.

In some embodiments, the number of independent data subsets is further determined using a number of observations in a first analysis of the hypothesis test.

In some embodiments, calculating the individual significance level of the independent data subset includes dividing the significance level by the number of independent data subsets.

In some embodiments, calculating the individual significance level of the independent data subset includes allocating a portion of the significance level to the independent data subset based on a position of the independent data subset in the data.

In some embodiments, using the individual significance level to facilitate analysis of the hypothesis test involves including the individual significance level in a calculation of a metric associated with analysis of the hypothesis test.

In some embodiments, using the individual significance level to facilitate analysis of the hypothesis test further involves using the metric to validate a result of the hypothesis test.

In some embodiments, the metric includes at least one of a confidence interval, a distinguishable effect size, an amount of data required to produce the distinguishable effect size, a p-value comparison, and an amount of data required to conduct the hypothesis test.

In some embodiments, the hypothesis test includes an A/B test.

In some embodiments, the message includes an advertisement, a web page, an email, a layout, a design, an image, and a user flow.

BRIEF DESCRIPTION OF THE FIGURES

In the figures, like reference numerals refer to the same figure elements.

DETAILED DESCRIPTION

Figure 1:
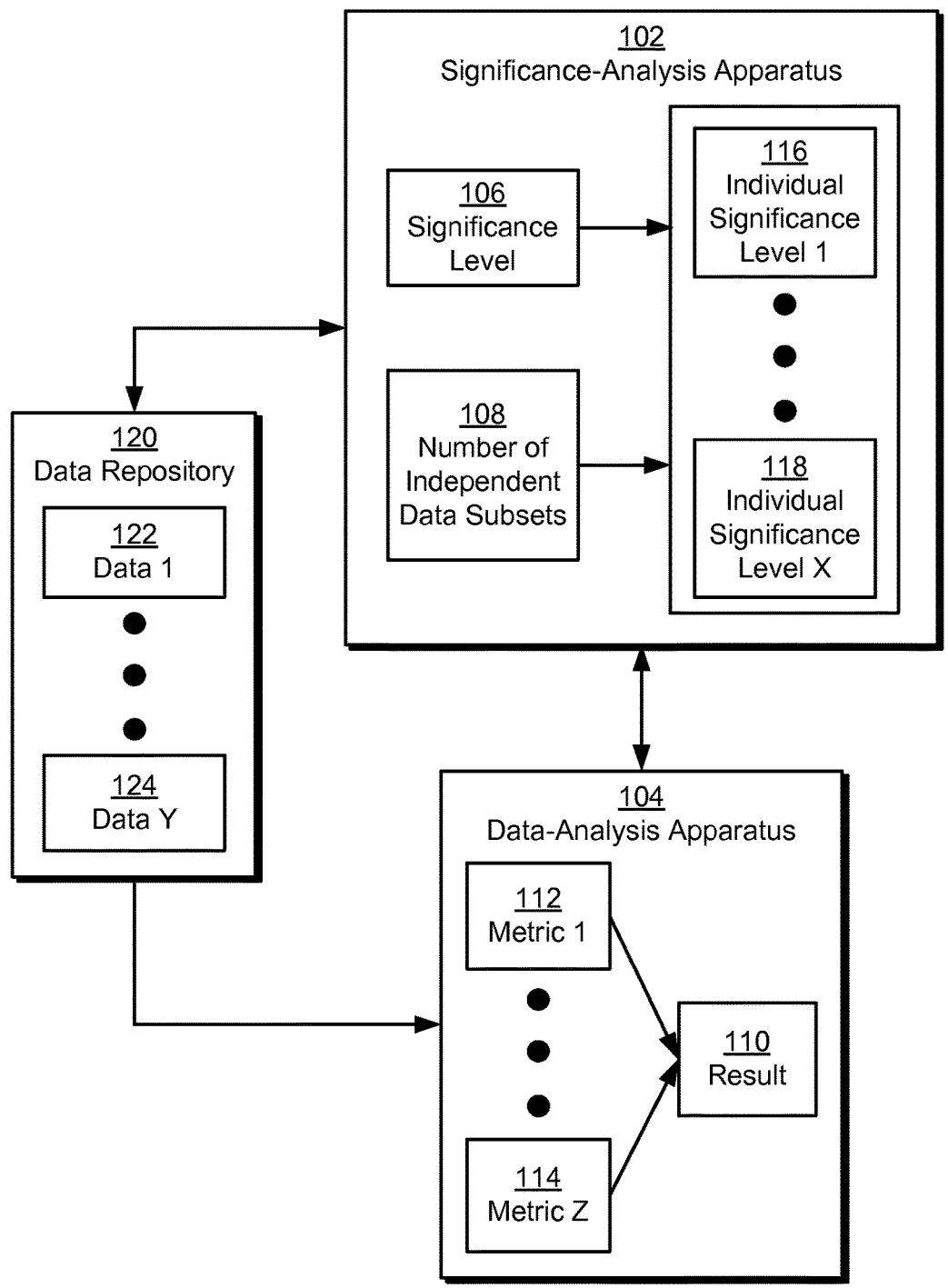
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Hypothesis testing, such as A/B testing, is often used to select among two or more versions of a message to optimize an outcome of interest. For example, an A/B test may include two different versions of an email offer, which are shown to two groups of users to determine which email offer has a better response rate. The email offer with the better response rate may then be shown to a subsequent group of users to increase sales made to the users.

During hypothesis testing, statistical inference may be applied to data to reject or "fail to reject" a null hypothesis at a pre-specified significance level. In other words, a hypothesis test may be run to determine if data collected during the hypothesis test produces a result that is statistically significant in supporting or rejecting the null hypothesis. However, ongoing analysis of the data while the hypothesis test is being run may violate the statistical validity of the hypothesis test, since such analysis may increase the false positive rate of the hypothesis test if the hypothesis test is stopped once statistically significant results are observed.

To facilitate accurate hypothesis testing, a number of independent data subsets associated with data from the hypothesis test may be determined. Each independent data subset may represent a subset of data collected in the hypothesis test for which the statistic under consideration has changed substantially from a previous subset of data from the hypothesis test. As a result, the independent data subsets may account for statistical fluctuations and/or changes to the result of the hypothesis test.

Next, an individual significance level may be calculated for each independent data subset and the statistical significance of the hypothesis test. For example, the same individual significance level may be obtained for each independent data subset by dividing the overall statistical significance of the hypothesis test by the number of independent data subsets. Alternatively, different individual significance levels may be produced by allocating a portion of the significance level to each independent data subset based on the position of the independent data subset in the data.

The individual significance level may then be used to facilitate the analysis of the hypothesis test. For example, the individual significance level may be included in a calculation of a metric associated with analysis of the hypothesis test. Because the individual significance level represents the contribution of the independent data subset to the overall statistical significance, the metric may more accurately reflect the statistical certainty of the hypothesis test at a given point than a conventional calculation of the metric that uses the overall significance level of the test at all points in the hypothesis test.

The disclosed embodiments provide a system that facilitates selecting a message to be presented to users based on a statistically valid hypothesis test. During operation, the system runs a hypothesis test by presenting alternate versions of a message to a test set of users and in response receives user feedback. Next, the system obtains a significance level for the hypothesis test and determines a number of independent data subsets associated with data from the hypothesis test. The system subsequently uses the significance level and the number of independent data subsets to calculate an individual significance level for each independent data subset. The system then uses the individual significance levels to determine an outcome of the hypothesis test, which involves selecting a version of the message based on the user feedback. Finally, the system presents the selected version of the message to additional users.

FIG. 1 shows a schematic of a system in accordance with the disclosed embodiments. The system of FIG. 1 may be used to facilitate hypothesis testing, such as A/B testing and/or multivariate testing. The system of FIG. 1 includes a significance-analysis apparatus 102, a data-analysis apparatus 104, and a data repository 120. Each of these components is described in further detail below.

Data repository 120 may include data (e.g., data 1 122, data y 124) collected during the hypothesis test. For example, an A/B test may be conducted by presenting two random samples of users with two versions A and B of a web page, email, offer, article, advertisement, layout, design, image, a user flow. and/or other message. Data from the A/B test may be collected as clicks, conversions, purchases, comments, and/or other user feedback to the presented versions, which are recorded in a database, file, filesystem, and/or other data repository 120 for subsequent retrieval and use. For example, the data may be retrieved from data repository 120 after the A/B test is finished to determine if the A or B version is associated with a higher user response rate. The user feedback may then be used to determine the outcome of the hypothesis test, which includes selecting one of the two versions based on the user feedback. For example, the user feedback may be analyzed to identify the version with a better response rate, conversion rate, revenue, sales, and/or other measurable outcome. The selected version of the message may then be presented to additional users.

Data collected during the test may be written to data repository 120 in real-time and/or with a short delay (e.g., minutes to hours). As a result, the data may be available for analysis and/or review before the hypothesis test is complete. For example, an experimenter may review data from the hypothesis test on a daily basis to determine if the data is statistically significant. However, such ongoing analysis of the data during the hypothesis test may lead to incorrect conclusions about the data if the hypothesis test is stopped once statistically significant results are found.

More specifically, statistical fluctuations in the data during the hypothesis test may produce results that seem to be statistically significant but actually differ from results observed at the end of the hypothesis test. Thus, stopping of the hypothesis test once statistically significant data is found may increase the rate of false positives in the hypothesis test (e.g., insignificant results that are deemed to be significant) and, in turn, produce statistically invalid results.

In one or more embodiments, the system of FIG. 1 includes functionality to maintain the statistical validity of the hypothesis test during ongoing analysis of data from the hypothesis test. For example, the system may allow statistically valid conclusions to be drawn from the data during the hypothesis test, regardless of the number of times the data is analyzed before the hypothesis test is over.

First, significance-analysis apparatus 102 may obtain a significance level 106 and a number of independent data subsets 108 for the hypothesis test. Significance level 106 may represent the probability that the null hypothesis is incorrectly rejected, or in other words, the acceptable error rate of the hypothesis test. For example, a 5% significance level 106 may represent the acceptance of a 5% error rate in the hypothesis test, or a 1-in-20 chance that the result of the hypothesis test is caused by statistical error in the sample. Significance level 106 may be determined before data for the hypothesis test is collected, along with other parameters related to the hypothesis test, such as the statistic of interest, a null hypothesis for the hypothesis test, a variable to be tested, treatments of the variable to be used in the hypothesis test, and/or one or more metrics (e.g., metric 1 112, metric z 114) to be used in analyzing the data from the hypothesis test.

Number of independent data subsets 108 may indicate the number of statistically independent sets of data in the hypothesis test. Each independent data subset in the hypothesis test may represent a subset of data in the hypothesis test for which the statistic under consideration has changed substantially from a previously collected subset of data in the hypothesis test. In other words, number of independent data subsets 108 may account for statistical fluctuations in the data that may interfere with the statistical validity of the hypothesis test while the hypothesis test is being conducted.

In one or more embodiments, a new independent data subset is encountered whenever the total amount of data collected in the hypothesis test doubles. In turn, number of independent data subsets 108 may be obtained as the logarithm of the total number of observations (e.g., data points) in the hypothesis test. For example, if data from 10,000 users is to be collected in the hypothesis test, number of independent data subsets 108 may be estimated as the natural logarithm of 10,000, or about 9.21, which is rounded up to 10. If the amount of data to be collected is not fixed, the total number of observations may be estimated as the maximum amount of data that can be reasonably collected during the hypothesis experiment.

Next, significance-analysis apparatus 102 may calculate, from significance level 106 and number of independent data subsets 108, an individual significance level (e.g., individual significance level 1 116, individual significance level x 118) for each independent data subset in the hypothesis test. The individual significance level of the independent data subset may represent the contribution of the independent data subset to the overall significance level 106 (e.g., error rate). As a result, significance-analysis apparatus 102 may assign the same individual significance level to all independent data subsets by dividing significance level 106 by number of independent data subsets 108. Alternatively, significance-analysis apparatus 102 may allocate a portion of significance level 106 to each independent data subset based on the position of the independent data subset in the data. For example, significance-analysis apparatus 102 may monotonically increase the individual significance levels of the independent data subsets so that later independent data subsets are allocated larger portions of significance level 106 than earlier independent data subsets, which have less data and thus may be more sensitive to statistical fluctuations in the data.

Once the individual significance levels are calculated by significance-analysis apparatus 102, data-analysis apparatus 104 may use the individual significance levels to facilitate analysis of the statistical test. In particular, data-analysis apparatus 104 may use the individual significance levels and data from data repository 120 to calculate a set of metrics (e.g., metric 1 112, metric z 114) associated with analysis of the hypothesis test, such as a confidence interval, a distinguishable effect size, an amount of data required to produce the distinguishable effect size, a p-value comparison, and/or an amount of data required to conduct the hypothesis test. For example, data-analysis apparatus 104 may obtain an individual significance level for the current independent data subset in the hypothesis test from significance-analysis apparatus 102 and use the individual significance level instead of significance level 106 in the calculation of one or more metrics that are used in the analysis.

Data-analysis apparatus 104 may then use the calculated metrics to validate a result 110 of the hypothesis test. For example, data-analysis apparatus 104 may use the metrics to identify and/or confirm the statistical validity of a result 110. Conversely, data-analysis apparatus 104 may use one or more metrics to reject the statistical validity of result 110 if result 110 was obtained using the overall significance level 106 of the hypothesis test instead of an individual significance level for the current decision point. Calculation and use of individual significance levels during analysis of hypothesis tests is described in further detail below with respect to FIG. 2.

By using independent data subsets and individual significance levels to calculate metrics and/or validate result 110, the system of FIG. 1 may enable the statistically valid analysis of data from the hypothesis test before the end of the hypothesis test. Moreover, such analysis may be performed at any point in the hypothesis test and adapted to changes in the number of observations and/or other parameters in the hypothesis test.

Those skilled in the art will appreciate that the system of FIG. 1 may be implemented in a variety of ways. More specifically, significance-analysis apparatus 102, data-analysis apparatus 104, and data repository 120 may execute on the same system or on different systems. For example, significance-analysis apparatus 102 and data-analysis apparatus 104 may be provided by the same hardware and/or software component, or significance-analysis apparatus 102 and data-analysis apparatus 104 may execute separately from one another. Along the same lines, significance-analysis apparatus 102, data-analysis apparatus 104, and data repository 120 may be provided by a single physical machine, multiple computer systems, one or more virtual machines, a grid, one or more databases, one or more filesystems, and/or a cloud computing system.

Figure 2:
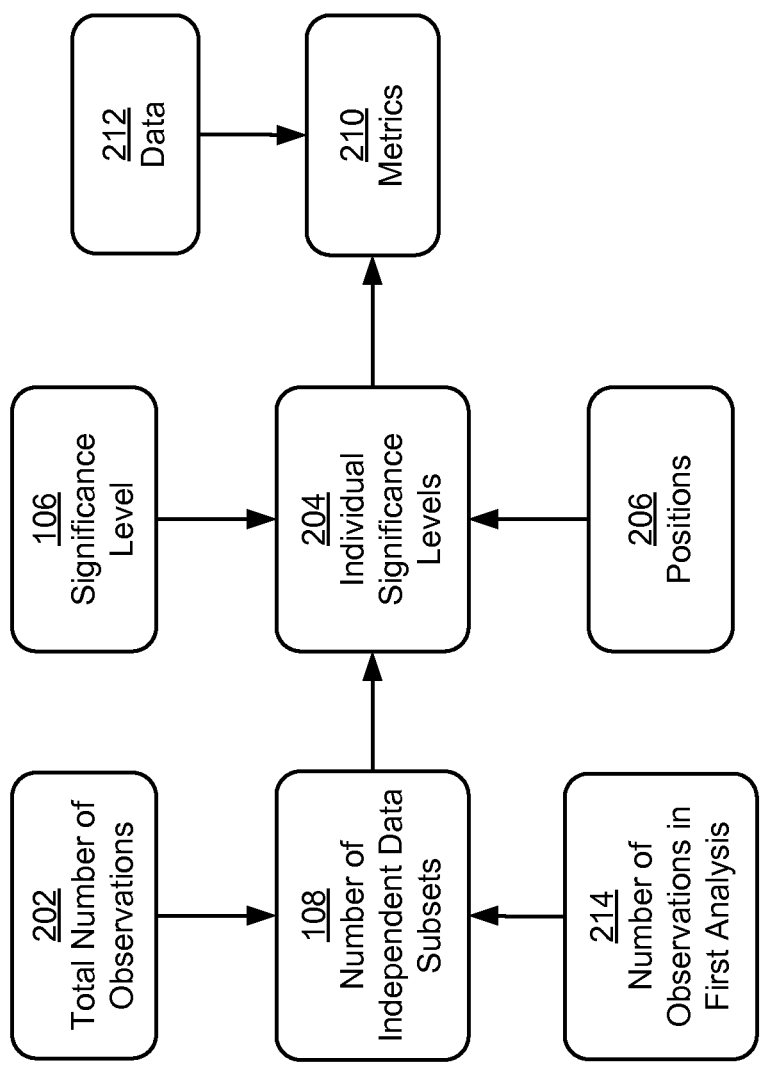
FIG. 2 shows the calculation and use of individual significance levels for independent data subsets associated with data from a hypothesis test in accordance with the disclosed embodiments.

FIG. 2 shows the calculation and use of individual significance levels 204 for independent data subsets associated with data 212 from a hypothesis test in accordance with the disclosed embodiments. As mentioned above, individual significance levels 204 may be calculated from number of independent data subsets 108 and significance level 106.

Number of independent data subsets 108 in data 212 may be calculated from a total number of observations 202 in the hypothesis test. Number of independent data subsets 108 may increase every time total number of observations 202 doubles. As a result, number of independent data subsets 108 may be estimated as a logarithm of total number of observations 202. Because number of independent data subsets 108 grows slowly with total number of observations 202, total number of observations 202 may be estimated without significantly impacting number of independent data subsets 108. For example, a value of 10,000 for total number of observations 202 may produce a value of approximately 9.21 for number of independent data subsets 108, while a value of 100,000 for total number of observations 202 may produce a value of approximately 11.51 for number of independent data subsets 108.

The value of number of independent data subsets 108 may be rounded up to the nearest whole number to provide a more conservative calculation of individual significance levels. Continuing with the above example, number of independent data subsets 108 may be rounded up to 10 for 10,000 total observations and to 12 for 100,000 total observations. Alternatively, a pre-specified number of independent data subsets 108 may be used for each hypothesis test, independently of total number of observations 202. For example, number of independent data subsets 108 may be set to 23 for hypothesis tests in which total number of observations 202 is expected to be at or below 10,000,000,000.

Number of independent data subsets 108 may further be determined using a number of observations in a first analysis 214 of the hypothesis test. In particular, number of independent data subsets 108 may be calculated using the following equation:

$$I(D) = Ce^D$$

In the above equation, I(D) may represent total number of observations 202, D may represent number of independent data subsets 108, and C may represent number of observations in the first analysis 214. C may be set to a conservative value such as 1 (e.g., indicating that the data is first analyzed after the first observation or data point) to increase number of independent data subsets 108. On the other hand, C may be set to a higher number if the first analysis of data occurs or is expected to occur later in the hypothesis test because data 212 already collected before the first analysis does not change, and large shifts in data 212 become less likely as more data 212 is collected.

Furthermore, the exponential equation above may be obtained through analysis of changes or shifts in data 212 as data 212 is collected. At observation m (e.g., the mth data point) in the hypothesis test, an event rate $\hat{r}_m = A_m/m$ may be observed, where $A_m$ is the number of unique events observed for the m observations. For example, $A_m$ may represent the number of users who purchase a product or service. A change in the event rate by a pre-specified amount $\Delta$ may represent "independence" in $\hat{r}$. In other words, if $\hat{r}_m \leq 0.5$, $\hat{r} \leq \hat{r}_m (\Delta-1)/\Delta$ or $\hat{r}_m (\Delta+1)/\Delta$ may indicate a shift in the event rate that reflects a statistically independent data subset in data 212. The inequalities may be solved to determine a minimum number l of additional observations to be taken before $\hat{r}$ is likely to leave this range:

$$\hat{r}_{m+l} < \hat{r}_m, \hat{r}_m \leq 0.5: \qquad \hat{r}_{m+l} > \hat{r}_m, \hat{r}_m \leq 0.5:$$

$$\hat{r}_{m+l} - \hat{r}_m = -\frac{\hat{r}_m}{\Delta} \qquad \hat{r}_{m+l} - \hat{r}_m = \frac{\hat{r}_m}{\Delta}$$

$$\frac{A_m + f(l)}{m+l} - \frac{A_m}{m} = -\frac{A_m}{\Delta m} \qquad \frac{A_m + g(l)}{m+l} - \frac{A_m}{m} = \frac{A_m}{\Delta m}$$

$$l = \frac{\Delta f(l) + m\hat{r}_m}{(\Delta - 1)\hat{r}_m} \qquad l = \frac{\Delta g(l) - m\hat{r}_m}{(\Delta + 1)\hat{r}_m}$$

$$\hat{r}_{m+l} < \hat{r}_m, \hat{r}_m \geq 0.5: \qquad \hat{r}_{m+l} > \hat{r}_m, \hat{r}_m \geq 0.5:$$

$$\hat{r}_{m+l} - \hat{r}_m = -\frac{1-\hat{r}_m}{\Delta} \qquad \hat{r}_{m+l} - \hat{r}_m = \frac{1-\hat{r}_m}{\Delta}$$

$$\frac{A_m + f(l)}{m+l} = \frac{A_m}{m} = -\frac{1}{\Delta} + \frac{A_m}{\Delta m} \qquad \frac{A_m + g(l)}{m+l} - \frac{A_m}{m} = \frac{1}{\Delta} - \frac{A_m}{\Delta m}$$

$$l = \frac{\Delta f(l) + m(1-\hat{r}_m)}{(\Delta + 1)\hat{r}_m - 1} \qquad l = \frac{\Delta g(l) - m(l-\hat{r}_m)}{(\Delta - 1)\hat{r}_m + 1}.$$

In the above equations, f(l) and g(l) give the probabilistic minimum and maximum additional unique actions for the additional unique observations l.

Expressions for f and g may be given by the binomial cumulative distribution function (CDF) using the estimated rate $\hat{r}_m$:

$$\sum_{i=0}^{f} \left( \frac{l!}{i!(l-i)!} \right) \hat{r}_m^i (1-\hat{r}_m)^{l-i} \leq \frac{\alpha}{2} \quad \sum_{i=0}^{g} \left( \frac{l!}{i!(l-1)!} \right) \hat{r}_m^i (1-\hat{r}_m)^{l-i} \geq 1 - \frac{\alpha}{2}$$

In the expressions, f is maximized and g is minimized given the constraints. To solve for l, the binomial distribution is approximated with a normal distribution:

$$\Phi\left( \frac{f - \hat{r}_m l}{\sqrt{\hat{r}_m l(1-\hat{r}_m)}} \right) \approx \frac{\alpha}{2}$$

$$f \approx \hat{r}_m l + \sqrt{\hat{r}_m l(1-\hat{r}_m)} * \Phi^{-1}\left(\frac{\alpha}{2}\right) = \hat{r}_m l + z_- \sqrt{\hat{r}_m l(1-\hat{r}_m)}$$

$$\Phi\left( \frac{g - \hat{r}_m l}{\sqrt{\hat{r}_m l(1-\hat{r}_m)}} \right) \approx 1 - \frac{\alpha}{2}$$

$$g \approx \hat{r}_m l + \sqrt{\hat{r}_m l(1-\hat{r}_m)} * \Phi^{-1}\left(1 - \frac{\alpha}{2}\right) = \hat{r}_m l + z_+ \sqrt{\hat{r}_m l(1-\hat{r}_m)}.$$

Combining these equations with the previous expressions for l may result in a quadratic equation:

$$l = \left(-b \pm \sqrt{b^2 - 4ac}\right)/2a.$$

In the quadratic equation:

$$\hat{r}_m \leq 0.5: \quad \hat{r}_m \geq 0.5:$$

$$a = \hat{r}_m^2 \quad a = (1-\hat{r}_m)^2$$

$$b = 2\hat{r}_m^2 - \Delta^2 z^2 \hat{r}_m (1-\hat{r}_m) \quad b = 2(1-\hat{r}_m)^2 m - \Delta^2 z^2 \hat{r}_m (1-\hat{r}_m)$$

$$c = \hat{r}_m^2 m^2 \quad c = (1-\hat{r}_m)^2 m^2.$$

If the solution is required to be real ($b^2 \geq 4ac$) and l is required to be positive (b<0), restrictions on $\Delta$ may be placed with the following result:

$$\hat{r}_m \leq 0.5: \quad \hat{r}_m \geq 0.5:$$

$$\Delta \geq \frac{2}{z}\sqrt{\frac{\hat{r}_m m}{1-\hat{r}_m}} \quad \Delta \geq \frac{2}{z}\sqrt{\frac{(1-\hat{r}_m)m}{\hat{r}_m}}.$$

Taking $\Delta = \Delta_{min}$, the minimum value that satisfies the above inequalities, results in l=m. The number of impressions I(D) may then be calculated as a function of number of independent data subsets 108, or D. For each additional independent data subset, $\Delta I = I$ additional observations are required. As a result, $\Delta I/\Delta D = I$. The equation may be rearranged and integrated to form the continuous function $I(D) = Ce^{(D-1)}$. C is the constant of integration, which may be set to number of observations in the first analysis 214. Using conservative values of C=1 and $I_{max} = 10^{10}$, $D_{max} = 24$. In other words, a maximum of 24 independent data subsets may be found in up to 10 billion observations from a hypothesis test.

Once number of independent data subsets 108 is obtained, individual significance levels 204 may be calculated from significance level 106 and number of independent data subsets 108. Individual significance levels 204 may be set to the same value for all independent data subsets of data 212. To calculate equal individual significance values 204 for all independent data subsets, significance level 106 may be divided by number of independent subsets 108. For example, a conservative value of 23 for number of independent subsets 108 and a value of 0.05 for significance level 106 may produce 23 individual significance levels 204, all with the same value of 0.0022. In other words, 23 independent data subsets may each contribute 0.0022 to the value of 0.05 for significance level 106.

Alternatively, different portions of significance level 106 may be allocated to different independent data subsets based on the positions 206 of the independent data subsets in data 212. For example, earlier independent data subsets may be allocated smaller portions of significance level 106 than later independent data subsets because less data 212 is collected in the earlier independent data subsets, which may cause the earlier independent data subsets to be more sensitive to statistical fluctuations in data 212. Consequently, significance level 106 may be divided among individual significance levels 204 evenly or unevenly.

Individual significance levels 204 may then be included in the calculation of one or more metrics 210 from data 212 already collected in the hypothesis test. For example, individual significance levels 204 may be used in lieu of significance level 106 in calculating metrics 210. Because individual significance levels 204 are based on number of independent data subsets 108 and/or positions 204 of the independent data subsets, metrics 210 may be statistically valid, regardless of the amount of data 212 already collected.

If individual significance levels 204 are all equal, the value to which all individual significance levels 204 are set is used in the calculation of all metrics 210, and the current independent data subset of the hypothesis test is not tracked. For example, a value of 0.0022 for all individual significance levels 204 may be substituted for a value of 0.05 for significance level 106 whenever significance level 106 appears in the calculation of a metric.

On the other hand, if individual significance levels 204 are not equal, the current independent data subset represented by data 212 is identified, and the individual significance level of the independent data subset is used in the calculation of metrics 210. For example, the first independent data subset may include 100 observations that were collected before the first analysis of data 212. The exponential function above may be used to produce a value of ln(100/100)+1, or 1, to represent the first independent data subset. In turn, the independent data subset of the 300$^{th}$ observation may be calculated as ln(300/100)+1, or about 2.1, which may be rounded up to 3. The 300$^{th}$ observation may thus be considered to lie in the third independent data subset. In turn, the individual significance level allocated to the third independent data subset may be used in the calculation of metrics 210 during analysis of data 212 after the 300$^{th}$ observation.

Metrics 210 may include a confidence interval, a distinguishable effect size, an amount of data required to produce the distinguishable effect size, a p-value comparison, and/or an amount of data required to conduct the hypothesis test. For example, the event rate $\hat{r}$ may be estimated as the number of unique events k divided by the number of observations n, or $\hat{r} = k/n$. A confidence interval for the event rate may be calculated as a binomial proportion confidence interval such as the Agresti-Coull interval. Within the confidence interval, an individual significance level of the current independent data subset may be substituted for significance level 106.

The rate difference $\hat{d}$ may be the difference in event rates from two different treatments, or $\hat{d} = \hat{r}_1 - \hat{r}_2$. Confidence intervals for the rate difference may be calculated using a two-proportion hypothesis test, given by:

$$z(\alpha) = \frac{(\hat{r}_1 - \hat{r}_2) - d_0}{\sqrt{\frac{\hat{r}_1(1-\hat{r}_1)}{n_1} + \frac{\hat{r}_2(1-\hat{r}_2)}{n_2}}}.$$

In the equation, $z(\alpha)$ may represent the number of standard deviations from the mean corresponding to significance level 106, or $\alpha$. The confidence intervals for the rate difference at a given point in the hypothesis test may thus be calculated by substituting the individual significance level of the independent data subset in which the point lies for $\alpha$.

If the actual rates are such that $r_1 - r_2 = d_0$, then the hypothesis test will incorrectly report that $r_1 - r_2 \neq d_0$ no more than a percent of the time. Hence, confidence bounds may be calculated by solving for $d_0$ and using both the positive and negative values for z:

$$d_0 = (\hat{r}_1 - \hat{r}_2) \mp z(\alpha)\sqrt{\frac{\hat{r}_1(1-\hat{r}_1)}{n_1} + \frac{\hat{r}_2(1-\hat{r}_2)}{n_2}}.$$

The distinguishable effect size may be the smallest value of $\hat{d}$ that satisfies the above equation with $d_0=0$. In other words, the distinguishable effect size may be a value of $\hat{r}_2$ closest to $\hat{r}_1$ for which, if the value were observed, the hypothesis test would conclude $\hat{r}_1 \neq \hat{r}_2$. There are two such values, one less than and one greater than $\hat{r}_1$. Such values may be calculated by rearranging the above equation:

$$z\sqrt{\frac{\hat{r}_1(1-\hat{r}_1)}{n_1} + \frac{\hat{r}_2(1-\hat{r}_2)}{n_2}} = (\hat{r}_1 - \hat{r}_2)$$

$$z^2\left(\frac{\hat{r}_1(1-\hat{r}_1)}{n_1} + \frac{\hat{r}_2(1-\hat{r}_2)}{n_2}\right) = \hat{r}_1^2 - 2*\hat{r}_1\hat{r}_2 + \hat{r}_2^2$$

$$0 = \hat{r}_2^2(1+\gamma_2) - \hat{r}_2(2*\hat{r}_1 + \gamma_2) + \hat{r}_1^2(1+\gamma_1) - \hat{r}_1\gamma_1.$$

In the quadratic equation, $\gamma_i = z^2/n_i$, and two roots $\hat{r}_2$ are produced. The lesser root may be used for positive z (implying $r_1 > r_2$), and the greater root is used for negative z. These values may then be used to calculate the two values of $\hat{d}$. Moreover, in a symmetric normal distribution, $z=\pm|z|$. If a nonsymmetric distribution is used, the positive and negative values of z may need to be distinguished from one another.

The amount of data 212 required to produce a distinguishable effect size may be calculated by using the effect size d as a parameter and calculating the corresponding amount of data needed:

$$z(\alpha) = \frac{(\hat{r}_1 - \hat{r}_2)}{\sqrt{\frac{\hat{r}_1(1-\hat{r}_1)}{\lambda n_1} + \frac{\hat{r}_2(1-\hat{r}_2)}{\lambda n_2}}}$$

$$\lambda = \left(\frac{z}{d}\right)^2\left(\frac{\hat{r}_1(1-\hat{r}_1)}{n_1} + \frac{\hat{r}_2(1-\hat{r}_2)}{n_2}\right)$$

In the above equations, $n_1$ and $n_2$ may be assumed to scale at the same rate, $\hat{r}_1$ may be fixed, and $\hat{r}_2 = \hat{r}_1 - d$. The function may return $1/\lambda$ as the fraction of data 212 needed to produce the distinguishable effect size.

A pooled hypothesis test may also be used to calculate the distinguishable effect size by symmetrizing between two treatments using the following:

$$z(\alpha) = \frac{\hat{r}_1 - \hat{r}_2}{\sqrt{\hat{r}*(1-\hat{r})*\left(\frac{1}{n_1} + \frac{1}{n_2}\right)}}$$

In the above equation, the pooled rate is $\hat{r} = (k_1 + k_2)/(n_1 + n_2)$. The pooled rate may be assumed to remain constant, and $\hat{d} = \hat{r}_1 - \hat{r}_2$ may be calculated for positive and negative z. Like the distinguishable effect size, the amount of data 212 required to produce the symmetric distinguishable effect size may be calculated by using the effect size d as a parameter and calculating the corresponding amount of data needed:

$$z(\alpha) = \frac{\hat{r}_1 - \hat{r}_2}{\sqrt{\hat{r}*(1-\hat{r})*\left(\frac{1}{\lambda n_1} + \frac{1}{\lambda n_2}\right)}}$$

$$\lambda = \left(\frac{z}{d}\right)^2 * \hat{r} * (1-\hat{r}) * \left(\frac{1}{n_1} + \frac{1}{n_2}\right)$$

A p-value comparison may be performed by calculating a p-value based on the observed event rate $\hat{r}$ and comparing to the significance level. For example, the null hypothesis may be that the true event rate is $r_0$. The p-value may be estimated as:

$$p \approx 2 - 2\Phi\left((\hat{r} - r_0)\sqrt{n/(r_0(1-r_0))}\right)$$

In the above equation, the cumulative distribution function of the normal distribution $\Phi$ is used as an approximation for the binomial distribution. The null hypothesis may be rejected if the p-value is smaller than the significance level. The individual significance level of the current independent data subset may be substituted for significance level 106.

The amount of data required to conduct the hypothesis test may be calculated by obtaining user input from an experimenter for a confidence level $1-\alpha$, expected event rate $\hat{r}$, minimum effect size d, and/or allocation percentages $a_1$ and $a_2$ for a pair of treatments in the hypothesis test. Using the above equation, $\lambda=1$ and $n_i = a_i n$, the equation may be solved for n, the total number of unique observations:

$$n = \left(\frac{z}{d}\right)^2 * \hat{r} * (1-\hat{r}) * \left(\frac{1}{a_1} + \frac{1}{a_2}\right).$$

The result n may be reported to the experimenter as total number of observations 202 needed for the hypothesis test. Alternatively, the experimenter may be queried for the number of unique observations (e.g., users) per day u and a sampling percent s to provide a predicted number of days n/su over which the hypothesis test should run. As with other metrics 210, the individual significance level of the current independent data subset may be used in lieu of significance level 106 in the confidence level and subsequent calculation of the amount of data required to conduct the hypothesis test. For example, the individual significance level of the current independent data set may be used to determine the amount of additional data that has to be collected before the hypothesis test produces a statistically significant result.

Figure 3:
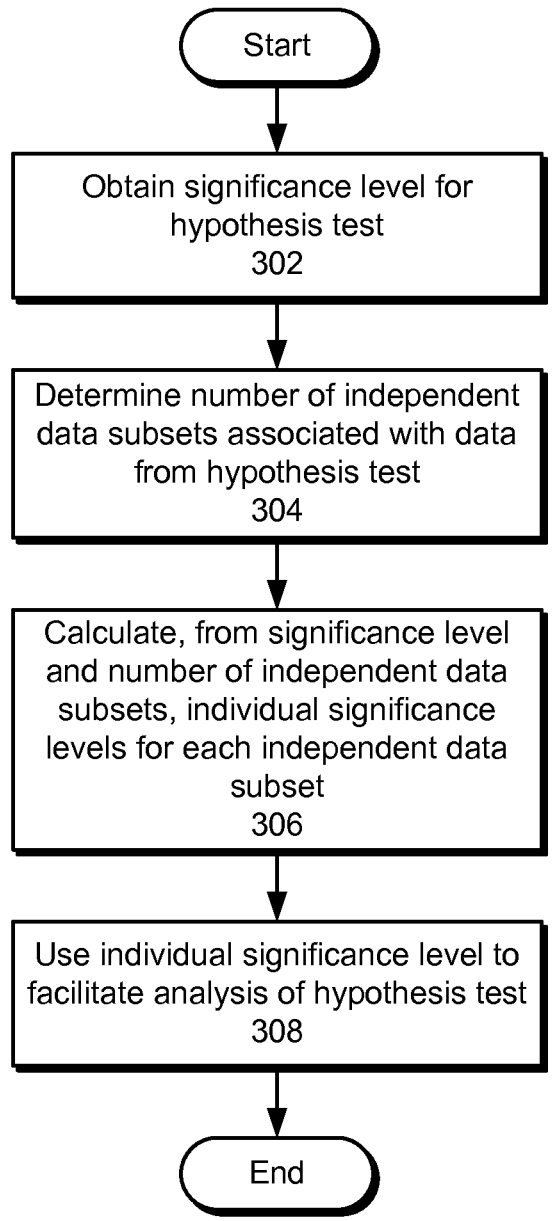
FIG. 3 shows a flowchart illustrating the process of facilitating hypothesis testing in accordance with the disclosed embodiments.

FIG. 3 shows a flowchart illustrating the process of facilitating hypothesis testing in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a significance level for the hypothesis test is obtained (operation 302). The significance level may represent the probability of a result of the hypothesis test occurring due to chance, or in other words, the acceptable error rate of the hypothesis test. Next, a number of independent data subsets associated with data from the hypothesis test is determined (operation 304). For example, the number of independent data subsets may be determined as a logarithm of the total number of observations in the hypothesis test. The number of independent data subsets may also be determined using the number of observations in a first analysis of the hypothesis test.

An individual significance level is then calculated for each independent data subset from the significance level and the number of independent data subsets (operation 306). For example, the same individual significance level may be calculated for every independent data subset by dividing the overall significance level for the hypothesis test by the number of independent data subsets. Alternatively, different individual significance levels may be allocated to different independent data subsets based on the positions of the independent data subsets in the data.

Finally, the individual significance level is used to facilitate analysis of the hypothesis test (operation 308). For example, the individual significance level may be included in a calculation of a metric associated with analysis of the hypothesis test, in lieu of the overall significance level for the hypothesis test. The metric may also be used to validate a result of the hypothesis test. For example, the metric may be used to determine a statistically valid outcome of the hypothesis test, such as selecting a version of a message that performs better with respect to a given user-related metric (e.g., sales, revenue, conversion rate, click-through rate, response rate, etc.) among two or more alternate versions of the message after a certain amount of user feedback is received up to a given point in the hypothesis test (e.g., before the end of the hypothesis test). The selected version may then be presented to additional users to improve the metric.

Figure 4:
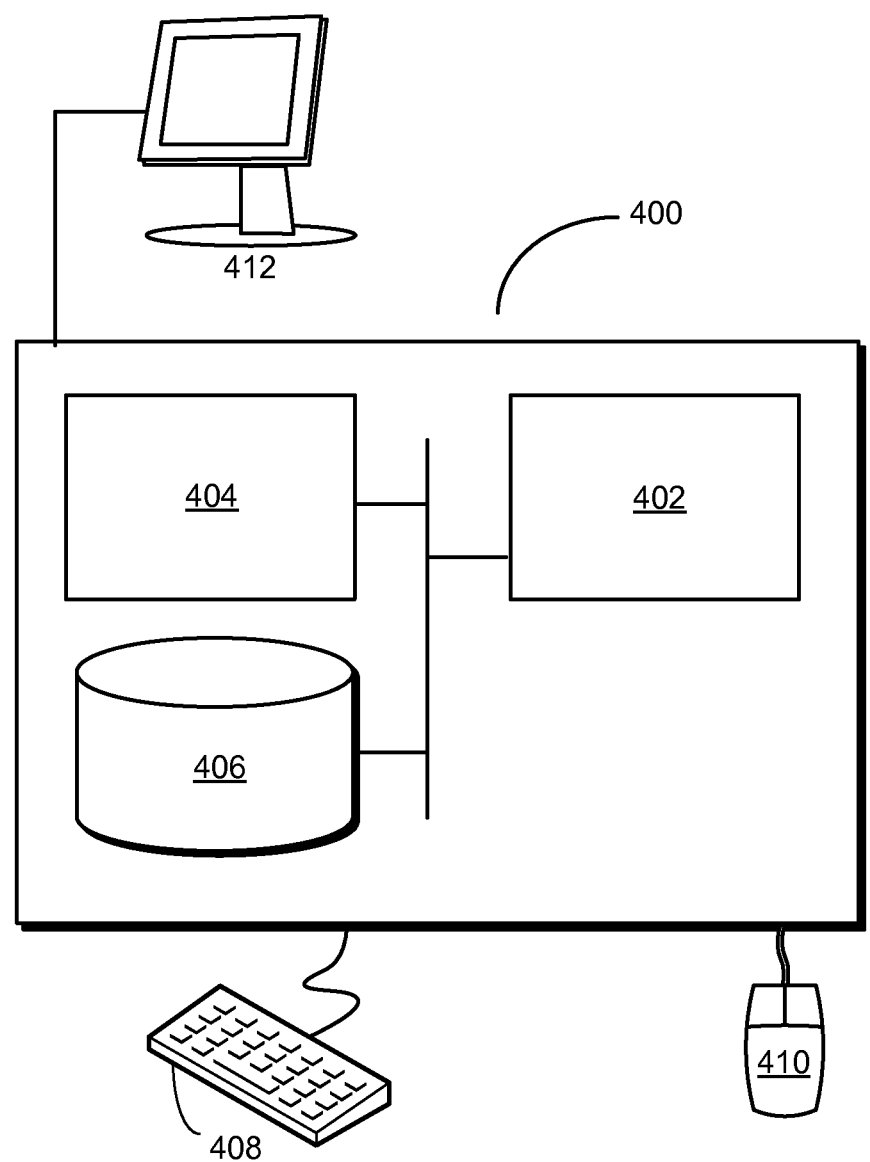
FIG. 4 shows a computer system in accordance with the disclosed embodiments.

FIG. 4 shows a computer system 400. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In particular, computer system 400 may provide a system for facilitating hypothesis testing. The system may include a significance-analysis apparatus and a data-analysis apparatus. The significance-analysis apparatus may obtain a significance level for a hypothesis test and determine a number of independent data subsets associated with data from the hypothesis test. The significance-analysis apparatus may also calculate, from the significance level and the number of independent data subsets, an individual significance level for each independent data subset from the independent data subsets. The data-analysis apparatus may use the individual significance level to facilitate analysis of the hypothesis test.

In addition, one or more components of computer system 400 may be remotely located and connected to the other components over a network. Portions of the present embodiments (e.g., significance-analysis apparatus, data-analysis apparatus, etc.) may also be located on different nodes of a distributed system that implements the embodiments. For example, the present embodiments may be implemented using a cloud computing system that facilitates analysis of data from hypothesis tests, which is collected from a set of remote users.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for selecting a message to be presented to one or more users, comprising:
   initiating a hypothesis test to send:
      a first version of a message to a first set of users; and
      a second version of the message to a second set of users;
   receiving user feedback from the first set of users and the second set of users during the hypothesis test to record in a data repository, wherein the user feedback includes a set of clicks;
   selecting, at a first time prior to completion of the hypothesis test as the data repository continues to record the user feedback, the first version of the message based on the user feedback recorded in the data repository by:
      obtaining a significance level for the hypothesis test;
      determining a number of independent data subsets based on the user feedback recorded in the data repository;
      calculating, from the significance level and the number of independent data subsets, an individual significance level for each independent data subset; and
      calculating a metric based on an individual data subset and respective individual significance level to validate the selection of the first version of the message; and
   presenting the first version of the message to additional users.

2. The computer-implemented method of claim 1, wherein the number of independent data subsets is determined using a logarithm of a total number of observations in the hypothesis test.

3. The computer-implemented method of claim 1, wherein calculating the individual significance level of the independent data subset comprises: dividing the significance level by the number of independent data subsets.

4. The computer-implemented method of claim 1, wherein calculating the individual significance level comprises: allocating a portion of the significance level to the independent data subset based on a position of the independent data subset in the user feedback.

5. The computer-implemented method of claim 1, wherein the message comprises:
   an advertisement;
   a web page;
   an email;
   a layout;
   a design;
   an image or a user flow.

6. The method of claim 1, wherein the user feedback comprises:
   a set of conversions;
   a set of purchases; or
   a set of comments.

7. The computer-implemented method of claim 1, wherein the method further comprises generating an analysis of the user feedback based on the individual significance level.

8. An apparatus, comprising:
   a processor; and
   a memory storing instructions that, when executed by the processor, cause the apparatus to perform a method for selecting a message to be presented to one or more users, the method comprising:
      initiating a hypothesis test to send:
         a first version of a message to a first set of users; and
         a second version of the message to a second set of users;
      receiving user feedback from the first set of users and the second set of users during the hypothesis test to record in a data repository, wherein the user feedback includes a set of clicks;
      selecting, at a first time prior to completion of the hypothesis test as the data repository continues to record the user feedback, the first version of the message based on the user feedback recorded in the data repository by:
         obtaining a significance level for the hypothesis test;
         determining a number of independent data subsets based on the user feedback recorded in the data repository;
         calculating, from the significance level and the number of independent data subsets, an individual significance level for each independent data subset; and
         calculating a metric based on an individual data subset and respective individual significance level to validate the selection of the first version of the message; and
      presenting the first version of the message to additional users.

9. The apparatus of claim 8, wherein the number of independent data subsets is determined using a logarithm of a total number of observations in the hypothesis test.

10. The apparatus of claim 9, wherein calculating the individual significance level of the independent data subset comprises: dividing the significance level by the number of independent data subsets.

11. The apparatus of claim 10, wherein calculating the individual significance level comprises: allocating a portion of the significance level to the independent data subset based on a position of the independent data subset in the user feedback.

12. The apparatus of claim 8, wherein the user feedback further comprises:
   a set of conversions;
   a set of purchases; or
   a set of comments.

13. The apparatus of claim 8, wherein the method further comprises generating an analysis of the user feedback based on the individual significance level.

14. The apparatus of claim 8, wherein the message comprises:
   an advertisement;
   a web page;
   an email;
   a layout;
   a design;
   an image; or
   a user flow.

15. A non-transitory computer-readable storage medium storing instructions that when executed by a computer cause the computer to perform a method for selecting a message to be presented to one or more users, comprising:
   initiating a hypothesis test to send:
      a first version of a message to a first set of users; and
      a second version of the message to a second set of users;
   receiving user feedback from the first set of users and the second set of users during the hypothesis test to record in a data repository, wherein the user feedback includes a set of clicks;
   selecting, at a first time prior to completion of the hypothesis test as the data repository continues to record the user feedback, the first version of the message based on the user feedback recorded in the data repository by:
      obtaining a significance level for the hypothesis test;
      determining a number of independent data subsets based on the user feedback recorded in the data repository;
      calculating, from the significance level and the number of independent data subsets, an individual significance level for each independent data subset; and
      calculating a metric based on an individual data subset and respective individual significance level to validate the selection of the first version of the message; and
   presenting the first version of the message to additional users.

16. The non-transitory computer-readable storage medium of claim 15, wherein the number of independent data subsets is determined using a logarithm of a total number of observations in the hypothesis test.

17. The non-transitory computer-readable storage medium of claim 15, wherein calculating the individual significance level of the independent data subset comprises:
   dividing the significance level by the number of independent data subsets; or
   allocating a portion of the significance level to the independent data subset based on a position of the independent data subset in the user feedback.

18. The non-transitory computer-readable storage medium of claim 15, wherein the user feedback further comprises:
   a set of conversions;
   a set of purchases; or
   a set of comments.

19. The non-transitory computer-readable storage medium of claim 15, wherein the method further comprises generating an analysis of the user feedback based on the individual significance level.

20. The non-transitory computer-readable storage medium of claim 15, wherein the message comprises:
an advertisement;
a web page;
an email;
a layout;
a design;
an image; or
a user flow.

* * * * *